Feb. 22, 1966
H. DE SANTIS
3,237,097
AMPLIFIER CALIBRATION CIRCUIT UTILIZING
SWITCHING THE OUTPUT OF THE
STABILIZING AMPLIFIER
Filed July 5, 1961
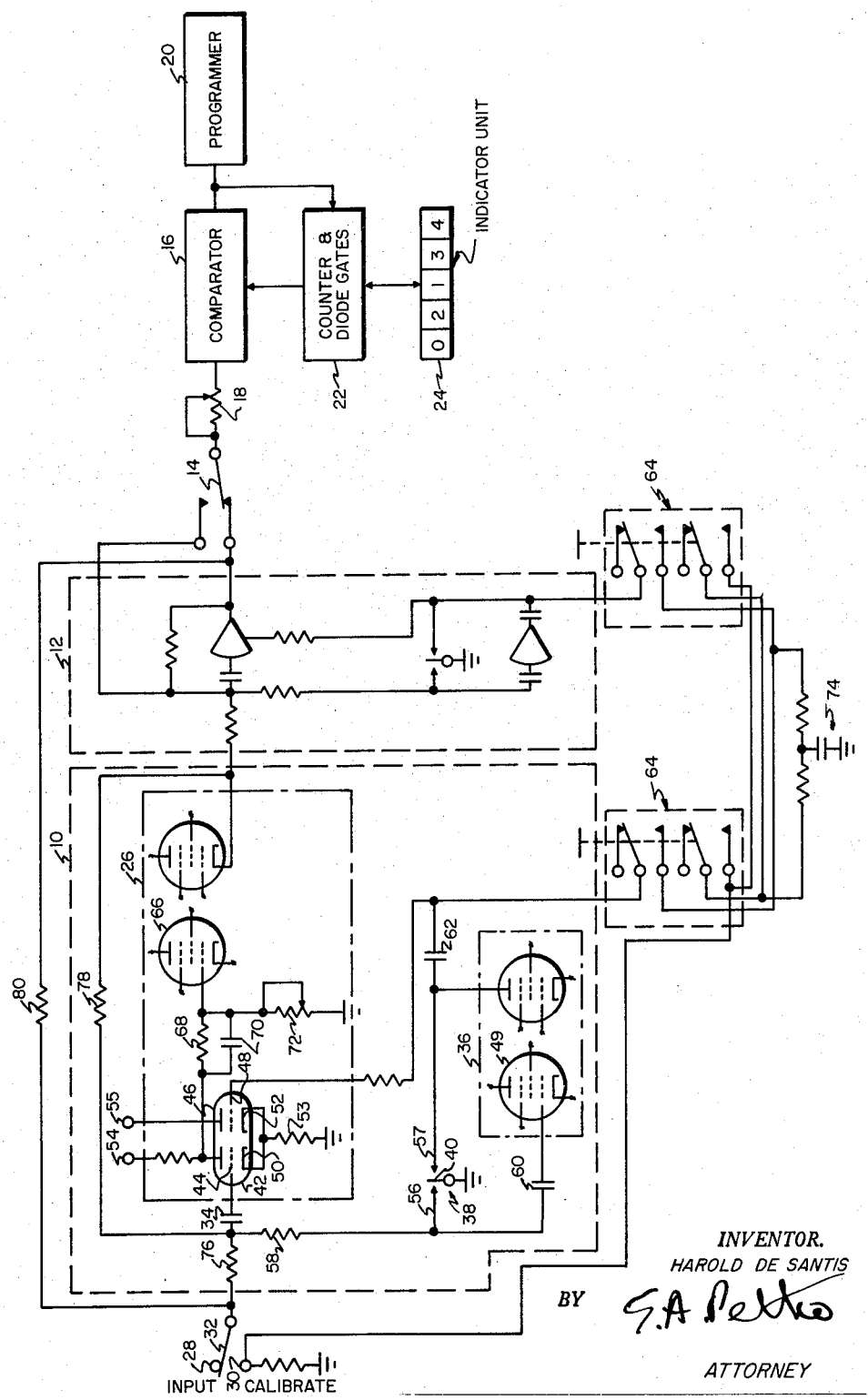
INVENTOR.
HAROLD DE SANTIS
BY
ATTORNEY

United States Patent Office 3,237,097
Patented Feb. 22, 1966

3,237,097
AMPLIFIER CALIBRATION CIRCUIT UTILIZING SWITCHING THE OUTPUT OF THE STABILIZING AMPLIFIER
Harold De Santis, Asbury Park, N.J., assignor to Electronic Associates Inc., Long Branch, N.J., a corporation of New Jersey
Filed July 5, 1961, Ser. No. 123,371
6 Claims. (Cl. 324—57)

This invention relates generally to a circuit for balancing amplifiers, and, more particularly, to a circuit for providing visual indication of the condition of balance or calibration of a D.C. amplifier.

The chopper stabilized D.C. amplifier is generally considered to be the most important component in an analog computer. When the amplifier is provided with appropriate feedback and input networks, it is capable of accurately summing, integrating, and differentiating voltage and current input signals. An additional important use of the amplifier is that of a phase inverter. The major factors contributing to the accuracy or inaccuracy with which these amplifiers perform these arithmetic and phase inverting operations is the amplifier components themselves. Tubes, transistors and capacitors develop leakage currents, power supply voltages are subject to variations, and, with time, the output signals from the amplifiers tend to drift or become offset from original predetermined conditions. In order to remedy the inaccuracies which may result from drift or offset, various amplifier balancing schemes have been proposed.

In one of the most commonly used balancing schemes the stabilizer or A.C. section of the amplifier is first connected to ground potential and then the through or D.C. section of the amplifier is adjusted until zero output or zero offset is obtained at the output terminals of the stabilizer section. The grounded condition of the stabilizer section is not generally considered to be a normal operating condition for the amplifier; consequently, even though the amplifier may be adjusted for zero offset, final and accurate balance of the amplifier is not generally obtained.

The present invention contemplates calibrating or balancing a D.C. amplifier by means of a circuit which simulates accurately the normal operating condition of the amplifier while permitting it to be adjusted for zero offset. To this end, the present circuit utilizes switch means in the input circuit of the amplifier for disconnecting it from the input signal source. This switch means simultaneously connects the output of the stabilizer to the input of the through section of the amplifier for amplification of the offset signal. Indicating means, such as a digital voltmeter or the like, may be provided at the output terminals of the through section in order to continuously monitor the output signal therefrom and visually indicate the condition of balance of the amplifier. Balance adjustment means, which may take the form of an adjustable potentiometer, are disposed within the through section of the amplifier for adjusting the amplifier for zero offset.

It is, therefore, an object of the present invention to provide an indicator to indicate visually the condition of balance or calibration of an amplifier.

A further object of the present invention is to provide means for balancing or calibrating a D.C. amplifier while simulating the normal operating condition of the amplifier.

These and other objects, features and advantages will become apparent from the following description taken in connection with the accompanying drawing, the single figure of which illustrates schematically a preferred embodiment of the present invention.

Referring to the drawing, there is shown a pair of similar D.C. amplifiers 10 and 12 connected in the input circuit of a conventional digital voltmeter for providing only one polarity of a bipolar input signal to the working components of the voltmeter and for unloading the input signal source. This particular environment of the amplifiers has been selected to illustrate the present invention because this form of input circuit is well known in the art and serves admirably to illustrate how a digital voltmeter may be utilized for balancing the amplifiers which form an integral part thereof.

As is well known, a single-pole, double-throw switch means 14 selects the output from either amplifier 10 or amplifier 12 and applies it to a conventional comparator circuit 16 via a potentiometer 18 which may serve to adjust the full scale indication of the voltmeter. Within the comparator the input signal is compared to a locally generated signal for producing difference signals which are applied to a programmer 20. The programmer is of any suitable conventional form and operates in conjunction with a counting matrix for switching a plurality of binary-coded decimal-weighted gates. The counter and gates are shown in block form at 22 and generate the local signal for comparison with the input signal within the comparator 16. The amplitude of the input signal may be displayed at a conventional indicator unit 24 upon attainment of zero difference signal from the comparator 16.

Since the amplifiers 10 and 12 are of similar design, only the amplifier 10 will be described in detail. Within the rectangle 26 there is shown a conventional direct coupled amplifier through section adapted to receive an input signal from the terminals 28 via the switch 32 and a grid current blocking capacitor 34. The A.C. amplifier section or stabilizer section of the present amplifier is shown at 36. Operating in conjunction with the amplifier 36 is a synchronous vibrator-rectifier or chopper 38 having an armature 40 and a field coil, not shown, which is supplied with an alternating potential of suitable frequency, e.g., 100 cycles per second. The direct coupled amplifier 26 may comprise a primary triode vacuum tube input stage 42 having a control grid 44 and an auxiliary triode vacuum tube input stage 46 having a control grid 48. The cathodes 50 and 52 for the two stages have a common resistance 53 connected to ground. Stages 42 and 46, being cathoded coupled, may be considered the input stage of the amplifier 26 and operate in the manner of a differential amplifier. An anode voltage is supplied at terminals 54 and 55 for the stages 42 and 46.

Vibrator-rectifier 38 is provided with a set of contacts 56, 57 cooperating with the armature 40 to convert the direct current signal taken from the input terminals 28 and 30 through a resistor 58 into a pulsating direct current potential having an amplitude proportional to the direct current signal. This pulsating potential is impressed through coupled capacitor 60 to the control electrode of the first stage of the amplifier 36 and appears after amplification in the several stages of the amplifier 36 as a modulated output signal at the coupling capacitor 62.

The capacitor 62 connects the output of amplifier 36 to the stationary contact 56 of chopper 38. Inasmuch as the armature 40 operates contact 56 with respect to ground potential at 180° out of phase with respect to contact 57, the output signal at the capacitor 62 is reconverted to a direct current potential, viz., it is demodulated. This demodulated signal is then applied to the grid 48 of the auxiliary section 46 after being filtered in a conventional low pass filter, not shown, to remove any high frequency components of potential.

The amplified and rectified signal which is applied to the grid 48 serves as a correction voltage or stabilizing signal for the direct coupled amplifier. This correction voltage is of such polarity and is introduced at such control electrode in the direct coupled amplifier with respect to the degree of amplifier gain controlled by that electrode as to compensate for the effects of drift due to variations in circuit components caused by aging, temperature changes, etc., to a high degree. Under conditions of amplifier balance or perfect calibration, there is no output signal from the stabilizer section.

In the present embodiment, this stabilizing signal is impressed directly upon the grid 48. As previously indicated, the auxiliary input stage 46 is cathode coupled to the primary input stage 42 through the cathode resistor 53. With this latter resistor being connected in common to the two input stages, a change in current in the stage 46 due to a change in potential on the grid 48 serves to control the cathode potential of the primary input stage 42.

The output potential from primary input stage 42 is applied to subsequent stages of the amplifier 26 for further amplification, and in the figure, the anode of stage 42 is shown to be resistance-capacitance coupled to the control grid of the next subsequent stage 66 in the amplifier 26. A parallel circuit arrangement of resistor 68 and capacitor 70 comprises this coupling arrangement. A resistor 72, which is peferably variable in form, connects the control grid of stage 66 to a point of fixed potential, such as ground. The resistors 68 and 72 function as a voltage divider for the output signal from the stage 42 and comprise part of the balancing circuit of the present amplifier.

The remainder of the present amplifier balancing circuit includes a switch means 64 and the low pass filter circuit 74. In the drawing the switch means 64 is seen to comprise an upper and a lower single-pole, double-throw section, the moveable pole portions of which are tied together so that it may be operated from a single operator. In the one or raised position of the switch means the output signal from stabilizer section 36 is connected directly to the through section 26 as heretofore described. In the other or lowered position of the switch means the output from the stabilizer section is additionally connected to one end of filter circuit 74, and the other end of the filter circuit is connected directly to the input terminal 30. Amplifier 12 is also provided with a switch means 64 connected to the same filter circuit 74 as amplifier 10.

In the normal linear operation of the amplifiers of the present invention, each is provided with a suitable input and feedback resistor, indicated at 76 and 78, so as to provide a gain of −1 to an applied input signal. An overall regenerative feedback circuit is provided from the output of amplifier 12 to the input of amplifier 10 via the impedance element 80 so as to unload or prevent current loading of the input signal source. In a condition of perfect balance of each amplifier the feedback signals applied via the resistor 78 to the input terminals of the amplifiers are of equal amplitude and of an opposite polarity to the input signal than applied to their input terminals. Thus, within the linear operating range of each amplifier, when the amplifiers are in a condition of perfect balance, their input terminals are maintained at zero potential. Should any difference exist between the amplitude of an input signal and the amplitude of a feedback signal, such as may be occasioned by drift or offset, this difference signal is applied to a corresponding stabilizer section 36 in order to effect corrective action to a corresponding through section 26, as heretofore described.

In an original or initial condition of balance of the amplifiers, there should be zero output from each amplifier when no input signal is applied from the terminal 28. The variable resistance element 72, the switch means 64, and the filter circuit 74 are utilized to this end. The switch means 32 is first actuated to a position to connect the input for amplifier 10 to the terminal 30. The switch means 64 associated with amplifier 10 are next depressed to connect the output from the stabilizer section of the corresponding amplifier to the input terminal 30. This signal is then amplified by the corresponding through section and displayed at the indicator unit 34. Potentiometer 72 is then adjusted to produce a zero signal indication at the indicator 24. This switch means 64 is then raised to restore amplifier 10 to normal operation and the described procedure is repeated for the amplifier 12.

While only one embodiment of the present invention has been shown and described herein, and inasmuch as this invention is subject to many variations, modifications and reversals of parts, it is intended that all matter contained herein shall be interpreted as illustrative and not in a limiting sense.

I claim:

1. In a calibration circuit for an amplifier comprising in combination, an input terminal connected to an input signal source, an output terminal, a direct coupled amplifier delivering an output signal to said output terminal, a stabilizing amplifier, means coupling said stabilizing amplifier to said input terminal, said direct coupled amplifier including means differentially combining the input signal from said input terminal with a first output from said stabilizing amplifier for delivering an input signal to said direct coupled amplifier, a degenerative feedback circuit coupled between said input and said output terminals, switch means for simultaneously (1) disconnecting said input signal source from said input terminal and (2) connecting a second output from said stabilizing amplifier to said input terminal whereby only said output from said stabilizing amplifier is delivered to said direct coupled amplifier, and means for adjusting said direct coupled amplifier to produce zero output therefrom when only said output from said stabilizing amplifier is being delivered thereto.

2. In a calibration circuit for an amplifier comprising in combination, an input terminal connected to an input signal source, an output terminal, a direct coupled amplifier delivering an output signal to said output terminal, a degenerative feedback circuit connected between said input terminal and said output terminal, a stabilizing amplifier, means coupling said stabilizing amplifier to said input terminal, said direct coupled amplifier including a differential amplifier receiving a first input signal from said input terminal and a second input signal from a first output of said stabilizing amplifier for delivering an input signal to said direct coupled amplifier, means for disconnecting said differential amplifier from said input terminal while connecting a second output from said stabilizing amplifier to said differential amplifier as a first input signal, and voltage adjusting means coupling the output from said differential amplifier to said direct coupled amplifier to produce zero output therefrom when only said stabilizing amplifier is connected to said differential amplifier.

3. A digital voltmeter for measuring and indicating the amplitude of an applied input signal comprising an input circuit including at least one amplifier having its input terminal connected to an input signal source, said amplifier including a direct coupled section having a differential section and a stabilizing section, a degenerative feedback circuit connected between the output of said direct coupled section and said input terminal, said stabilizing and differential sections including means for receiving an input signal from said input terminal, a first output of said stabilizing section being connected to said differential section as a second input signal, means for simultaneously disconnecting said input terminal from the signal source while connecting only a second output of said stabilizing section to said input terminal, and means coupling the output from said differential section to the input of said direct coupled section to reduce to zero the output signal therefrom while the output of said stabilizer section is connected to said input terminal and to said differential section.

4. A digital voltmeter according to claim 3 wherein said disconnecting means includes a low pass filter coupling the output of said stabilizer section to said input terminal.

5. A digital voltmeter for measuring and indicating the amplitude of an applied input signal comprising an input circuit including a pair of serially connected amplifiers, the input of one said amplifiers having its input terminal connected to an input signal source, each said amplifier including a direct coupled section having a differential section and a stabilizing section, a degenerative feedback circuit connected between the output of each said direct coupled sections and the input terminal of the corresponding said amplifier, a regenerative feedback circuit connected between the input terminal of said one amplifier and the output of the direct coupled section of the others of said amplifiers, said stabilizing and differential section of each amplifier including means for receiving an input signal from the input terminal of the corresponding amplifier, a first output of each said stabilizing section being connected to the corresponding said differential section as a second input signal, switch means for each said amplifier for disconnecting the input terminal of said one amplifier from the signal source while connecting a second output from the corresponding stabilizing section to said one amplifier input terminal, and means connecting the output from each said differential section to the input of the corresponding said direct coupled section to reduce to zero the output signal therefrom while the output of the corresponding said stabilizer section is connected to the input terminal of said one amplifier.

6. A calibration circuit for an amplifier system having an input circuit and output circuit and including a direct coupled amplifier and a stabilizing amplifier comprising an input signal source connected to said input circuit of said amplifier system.

impedance means connected between an input terminal of said direct coupled amplifier and said input circuit, an input terminal of said stabilizing amplifier being connected to said input terminal of said direct coupled amplifier, said direct coupled amplifier having an input stage thereof connected to a first output terminal of said stabilizing amplifier thereby to provide continuous stabilization of said direct coupled amplifier, switching means for simultaneously (1) disconnecting said input signal source from said input circuit and (2) connecting a second output terminal of said stabilizing amplifier to said input circuit whereby only the output from said stabilizing amplifier is applied as an input to said direct coupled amplifier, and means for adjusting said direct coupled amplifier to produce zero output at said output circuit when said output from said stabilizing amplifier is being applied both to said input circuit and to said input stage of said direct coupled amplifier.

References Cited by the Examiner

UNITED STATES PATENTS

| | | | |
|---|---|---|---|
| 2,681,952 | 6/1954 | Gilbert | 324—123 |
| 2,734,949 | 2/1956 | Berry | 324—130 X |
| 2,741,668 | 4/1956 | Iffland | 330—9 |
| 2,856,468 | 10/1958 | Berry | 324—123 X |
| 2,859,353 | 11/1958 | Cox | 324—123 X |
| 2,970,266 | 1/1961 | Malloy et al. | 324—123 |

FOREIGN PATENTS

| | | |
|---|---|---|
| 515,743 | 8/1955 | Canada. |
| 816,144 | 7/1959 | Great Britain. |

FREDERICK M. STRADER, *Primary Examiner.*

WALTER L. CARLSON, *Examiner.*